United States Patent Office 3,508,642
Patented Apr. 28, 1970

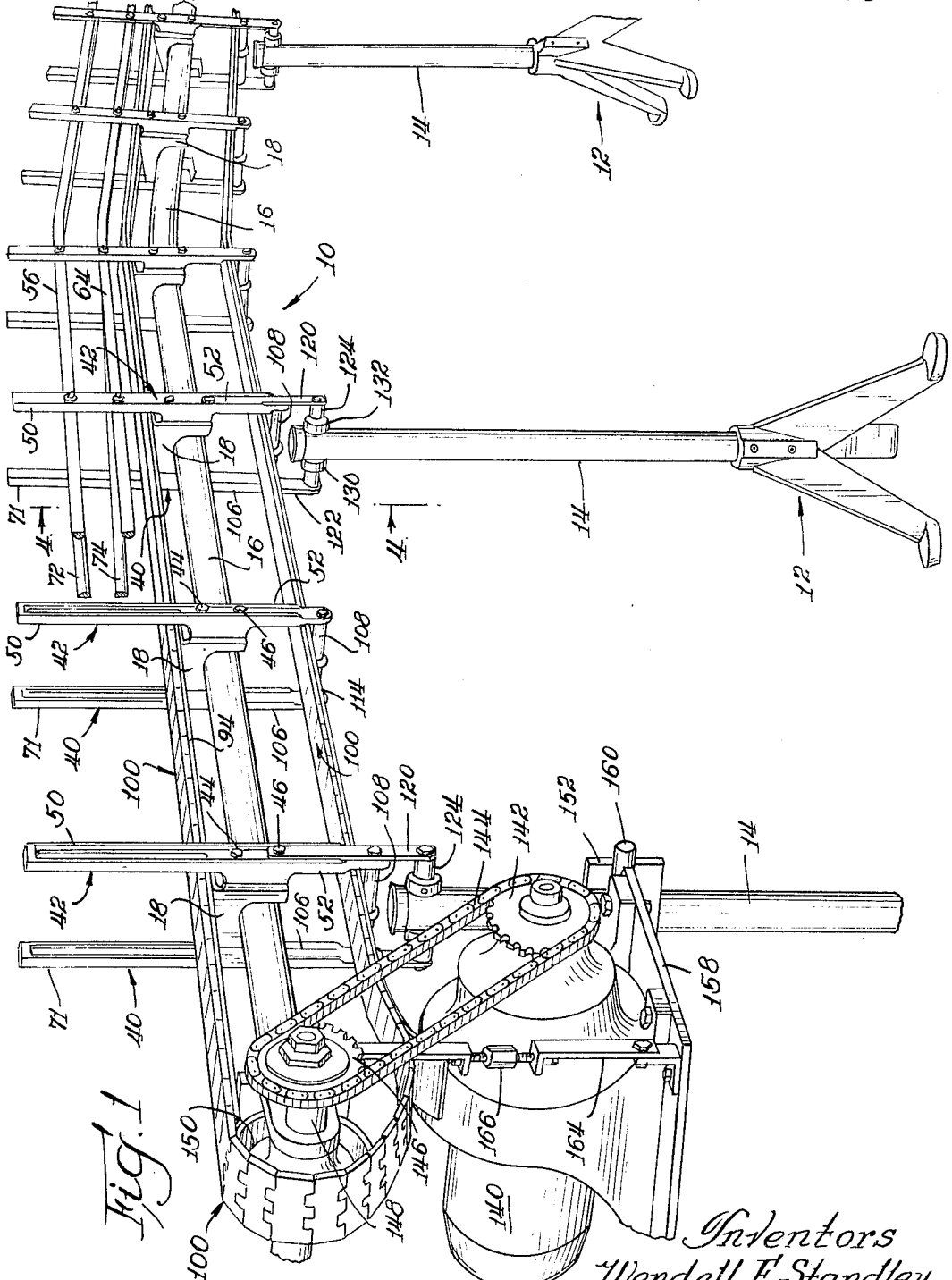

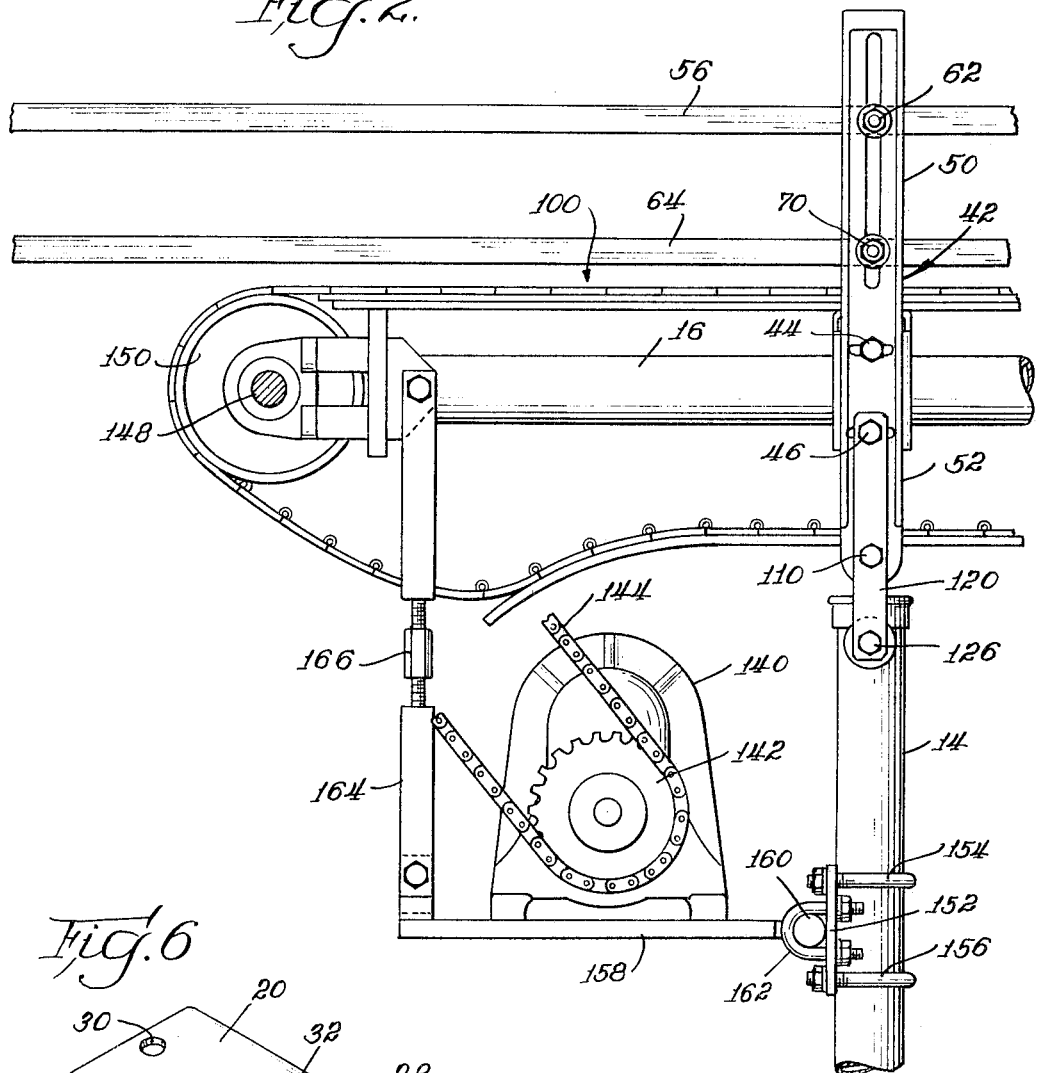

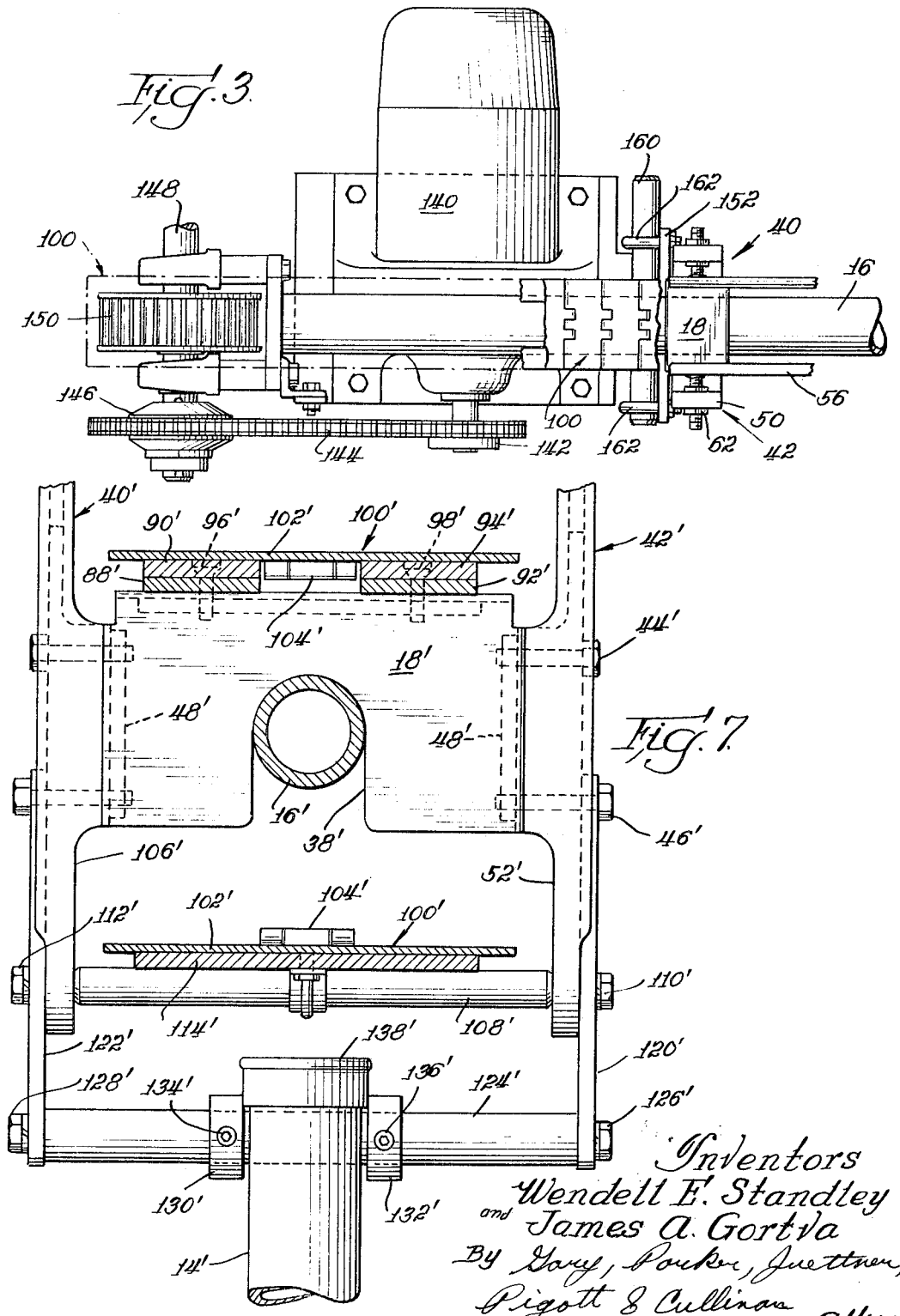

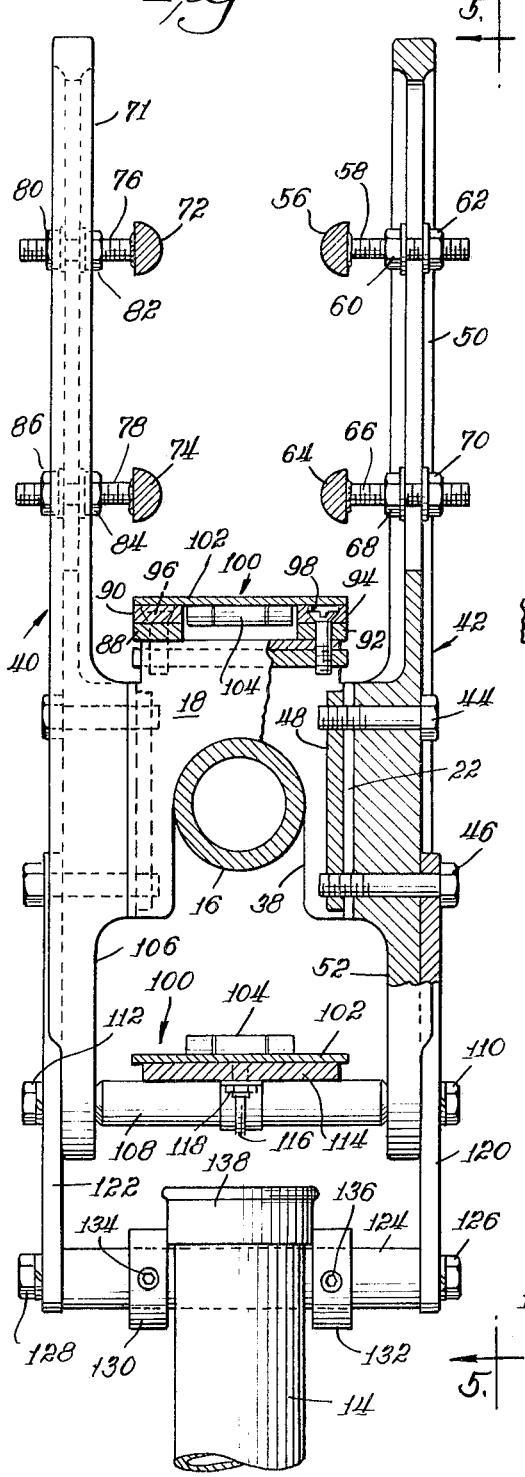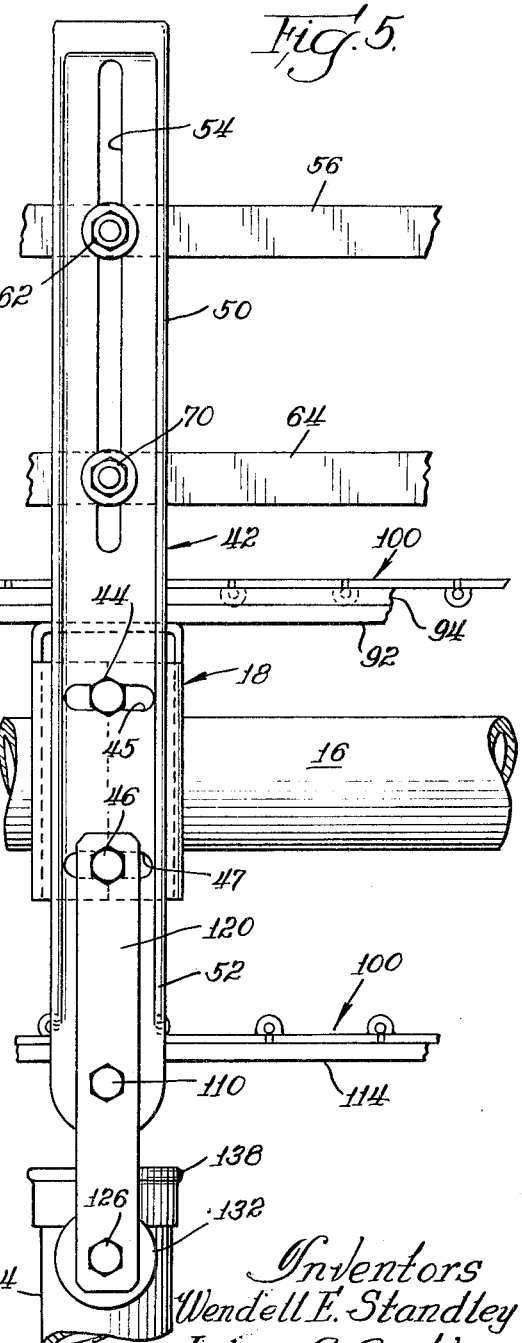

3,508,642
ARTICLE CONVEYOR MECHANISM
Wendell E. Standley, Lake Forest, and James A. Gortva, Chicago, Ill., assignors to Johns-Nigrelli-Johns, Inc., Skokie, Ill., a corporation of Illinois
Filed Feb. 14, 1968, Ser. No. 705,430
Int. Cl. B65g 15/62; F16h 7/14
U.S. Cl. 198—204                                    13 Claims

ABSTRACT OF THE DISCLOSURE

An improved modular type of article conveyor having a basic spine member of relatively small cross-section and having a plurality of saddle members or the like which are affixed to the spine member at spaced locations therealong, the saddle members serving to support wear plates which act as runners for a conveyor chain and also guide rails or the like, and at least certain ones of the saddles being supported from the floor so as to support the conveyor mechanism a predetermined distance above the floor.

BRIEF SUMMARY OF THE INVENTION

The present invention relates to an article conveyor of a type where an endless chain, for example a flat top chain, is trained over sprockets or the like and serves to convey articles from one location to another. The conveyor of the present invention is useful for conveying cans and bottles and the like, but it is by no means limited to such uses and is suitable for many varied applications.

Heretofore a conventional article conveyor of the type utilizing an endless flat conveyor chain or the like has been constructed by providing a pair of side plate members interconnected by cross members which are bolted or welded to the side plates. It is customary in constructing such a conveyor to space the side plates from one another a distance at least equal to the distance between the outside edges of the two wear plates or runners for the conveyor chain, and then various supporting brackets are bolted to the side plates to support article guide rails and the like. Consequently, it is customary that the relatively heavy side plates have holes punched therein at predetermined spaced locations along their length in order to accommodate the several supporting brackets which are bolted thereto. The wear plates or runners for the conveyor chain are normally mounted at the top of the side plates so as to be supported directly by the latter.

A conventional endless chain type of conveyor as described above comprises relatively heavy and expensive components and the assembly thereof is difficult and time consuming. For example, the heavy side plate members must have bolt holes punched at various locations therein, and such side plates are not standard items since their size and length depends upon the dimensions of the particular conveyor to be constructed.

It is therefore an object of the present invention to provide an improved article conveyor which is simpler and less expensive to manufacture and assemble than comparable conveyors heretofore known and which lends itself to a modular type of design comprised largely of standard components.

A further more specific object of the invention is to provide an article conveyor comprised of a basic spine member, for example a relatively small diameter tube or other hollow member, and a plurality of saddles or the like which are mounted at spaced locations along the length of the spine member and which serve to support wear plates for a conveyor chain and also guide rails or the like.

The foregoing and other objects and advantages of the invention will be apparent from the following description of a preferred embodiment thereof, taken in conjunction with the accompanying drawings.

DESCRIPTION OF THE DRAWINGS

FIGURE 1 is a fragmentary perspective view of an improved article conveyor constructed in accordance with the present invention;

FIGURE 2 is an enlarged fragmentary side elevational view of one end of the conveyor of FIGURE 1 showing the manner of supporting the conveyor from a floor-mounted pedestal and further showing means for mounting a drive motor for driving the conveyor chain;

FIGURE 3 is a top plan view of the conveyor apparatus of FIGURE 2;

FIGURE 4 is an enlarged vertical sectional view taken substantially along the line 4—4 of FIGURE 1;

FIGURE 5 is a fragmentary side elevational view looking approximately in the directions of the arrows 5—5 of FIGURE 4;

FIGURE 6 is a detail perspective view of a saddle member which comprises one of the components of the conveyor apparatus of FIGURE 1; and FIGURE 7 is a sectional view similar to FIGURE 4 showing a conveyor of the type shown in FIGURE 4 but for use with a flat conveyor chain of a substantially greater width than in the embodiment of FIGURE 4.

Now, in order to acquaint those skilled in the art with the manner of making and using our invention, we shall described, in conjunction with the accompanying drawings, certain preferred embodiments of the invention.

DETAILED DESCRIPTION OF THE INVENTION

Referring now to the drawings, FIGURE 1 shows an article conveyor 10 which is mounted from a floor by a plurality of floor-support pedestal members 12 each of which has associated therewith an upright support tube or the like 14. The conveyor 10 comprises a spine member 16 which in the embodiment illustrated is in the form of a relatively small diameter tube. The spine member 16 may extend for the full length of the conveyor and, as shown in FIGURE 1, the spine 16 may be bent if it is desired that the conveyor assume an upwardly or downwardly inclined course. Moreover, if desired the spine member 16 may be bent to go around a corner.

A plurality of saddle members or support brackets 18 are mounted on top of the spine member 16 at spaced locations along the length of the spine member. FIGURE 6 shows a saddle member 18 and as there shown it comprises a top wall 20, a pair of oppositely disposed side walls 22 and 24, and front and rear walls 26 and 28. The top wall 20 has a pair of holes 30 and 32 punched or otherwise formed therein for a purpose to be described hereinafter, and the side walls 22 and 24 each have a pair of holes 34 and 36 formed therein. The front and rear walls 26 and 28 each have a generally U-shaped opening formed therein as shown at 38 in FIGURE 6 so as to permit the saddle member to be mounted on the top of the tubular spine member 16 and affixed thereto by welding or other suitable means. It will be understood that the saddle support member 18 may be formed from a flat metal stamping which is punched to form the holes therein and then bent into the configuration shown in FIGURE 6. It will further be understood that the saddle member 18 may be manufactured in different sizes to accommodate conveyor chains of different widths, and that it may be produced as a standard or modular component the design of which is independent of the length of the conveyor 10.

Referring again to FIGURE 1, it will be seen that a plurality of the saddle support members 18 are mounted at spaced intervals on the top of the spine 18 and are welded to the spine. Each saddle member 18 has a pair of side brackets 40 and 42 secured thereto by means of a pair of bolts 44 and 46 which extend through horizontal slots 45 and 47 in the bracket and through the side wall of the saddle and are threaded into holes formed in a retainer plate 48, each plate 48 acting as a nut for a corresponding pair of bolts 44 and 46 (see FIGURES 4 and 7). As best shown in FIGURES 1 and 4, each bracket 42 comprises a generally upright member having an upwardly extending arm 50 and a downwardly extending arm 52. Each upwardly extending arm 50 has a vertical slot 54 formed therein (see FIGURE 5), and an upper guide rail 56 having a plurality of threaded studs 58 secured thereto is supported in a predetermined position by the several arms 50, the guide rail 56 being adjustably maintained in a selected vertical position by a pair of nuts 60 and 62 which are threaded on the stud 58 and adapted to clamp against opposite sides of the upright arm 50.

In a similar manner, a lower side guide rail 64 may be supported in a selected position from the plurality of upright bracket arms 50 by means of threaded studs 66 and nuts 68 and 70. It will be understood that the oppositely disposed brackets 40 are provided with upright arms 71 which function in the same manner to support a pair of upper and lower side guide rails 72 and 74 having threaded studs 76 and 78 thereon respectively which cooperate with nut members 80, 82, 84 and 86. It will be noted that the side guide rails 56, 64, 72 and 74 are adjustable vertically in the slots 54 and are also adjustable laterally to control the spacing between oppositely disposed guide rails.

Reference is now made to FIGURE 4 which shows a first pair of wear plates 88 and 90 secured to the top of the saddle 18 at one side thereof and a second pair of wear plates 92 and 94 secured to the top of the saddle at the other side thereof. It will be noted that the wear plate 90 is mounted on top of the plate 88 and the two are secured to the top of the saddle 18 by means of a flat-head screw 96. Similarly, the wear plate 94 is mounted on top of the plate 92 and the two are secured to the top of the saddle 18 by means of a flat-head screw 98. FIGURE 4 further shows a conveyor chain 100 positioned to ride on the two upper wear plates 90 and 94, the chain comprising interconnected flat-top link members 102 which ride along the wear plates and are supported thereby, and interconnecting hinge members 104 which move between the wear plates in the space provided therebetween.

In the embodiment being described the two lower wear plates 88 and 92 are preferably made of metal, whereas the two upper wear plates 90 and 94 which directly engage the chain may be made of wood, plastic, nylon, etc. and may be replaced when they become worn. On the other hand, if it is desired to provide metal wear plates for engagement with the chain, then the plates 88 and 90 may be made as a single metal wear plate of increased thickness, and the plates 92 and 94 may similarly be made as a single metal wear plate having increased thickness. The purpose in using separate upper and lower plates is to permit use of a permanent metal bottom or backing plate and a replaceable upper wear plate made of wood or nylon or the like. It will also be understood that each of the wear plates may extend continuously for any desired length and be supported intermittently by the various saddle members 18 to which it is affixed.

Still referring to FIGURE 4, the downwardly extending arm 52 of each bracket 42 cooperates with an oppositely disposed downwardly extending arm 106 of a corresponding bracket 40 to support a rod 108 which extends transversely therebetween. Each rod or bar 108 is supported between the bracket arms 52 and 106 by a pair of cap screws or the like 110 and 112. There is further provided a continuous chain return plate 114 which extends over the tops of the several support bars 108 and is affixed to each of the support bars by a U-shaped bracket 116 and a pair of screws or the like 118 which are threaded into the underside of the return plate.

It will thus be understood that the upper portion of the endless conveyor chain 100 rides on the runners or wear plates 90 and 94 and serves to support and convey articles which are carried thereon, while the lower or return portion of the endless conveyor chain rides along the return plate 114. While in the embodiment being described the chain 100 is supported during its return by the continuous support plate 114, it will be understood that the fixed support bars 108 could be replaced with rollers which would directly support the return portion of the chain 100, in which case the reutrn portion of the chain would be supported only intermittently rather than continuously along its length. With regard to the size of the article conveyor 10, it will be noted that the embodiment shown in FIGURE 7 is substantially the same as the embodiment of FIGURE 4 except that FIGURE 7 shows a substantially wider conveyor chain and a proportionately wider saddle member. Accordingly, the components of FIGURE 7 are identified with corresponding primed reference numerals.

FIGURES 1, 4 and 5 indicate the manner in which the conveyor 10 is supported from a floor by means of the pedestal floor support members 12 and upright support rods 14. Selected ones of the bracket arms 52 have secured thereto a link or strap 120 which extends downwardly from the lower end of the arm 52. Each link 120 is secured to the corresponding bracket arm 52 by the previously described bolt or screw members 46 and 110, and in a similar fashion an oppositely disposed link 122 is fastened to outside of the opposite bracket arm 106. A cross tube 124 is supported between the lower ends of the links 120 and 122 by cap screws or the like 126 and 128, and the upper end of the upright support tube 14 is provided with a transverse aperture through which the cross tube 124 passes so as to pivotally connect the support tube 14 with the brackets 40 and 42.

A pair of collars 130 and 132 are fixed on the cross tube 124 on opposite sides of the support tube 14 by set screws 134 and 136 so as to prevent transverse movement between the rod 14 and the cross tube 124, and a dust cap 138 is provided on the upper end of the tube 14. It will now be understood that through the connection between the conveyor assembly 10 and the support tubes 124 the members 14 serve to support the conveyor 10 a predetermined distance above the floor surface. It will further be understood that pivotal movement is permitted between the conveyor assembly 10 and the support tubes 14 at each cross tube 124 so that the conveyor may be supported in a level position even though the floor surface may be uneven.

FIGURES 1 and 2 show a motor 140 having a sprocket 142 which acts through a drive chain 144 to drive a sprocket 146, and the sprocket 146 is mounted on a shaft 148 which also mounts a sprocket 150 over which the conveyor chain 100 is trained and by means of which the conveyor chain is driven. FIGURE 2 shows a small plate 152 which is mounted from the side of the upright support tube 14 by a pair of U-bolts 154 and 156, and there is also shown a motor platform 158 having a hinge rod 160 welded to one side edge thereof. The platform 158 is positioned with the hinge rod 160 pivotally connected to the plate 152 by means of a pair of U-bolts 162 so as to permit the platform 158 to pivot about the axis of the hinge rod 160. The opposite end of the platform 158 is supported from the conveyor structure by a support bar 164 which includes an adjustable turnbuckle 166. Accordingly, it will be understood that by adjusting the turnbuckle 166 it is possible to adjust the pivotal position of the mounting platform 158 and thereby adjust the tension of the motor drive chain 144.

The article conveyor mechanism of the present invention possesses numerous important advantages over conventional endless chain type conveyors as heretofore known. The basic structural component is the spine 16 which need not itself have any bolt holes or the like formed therein and which readily lends itself to being bent if it is desired to have the conveyor assume an upwardly or downwardly inclined course or to turn toward one side or the other. FIGURE 1 shows the conveyor 10 extending first along an upwardly inclined path from left to right and then being bent so as to assume a more horizontal or even a downwardly inclined path if desired. The several saddles 18 are standard or modular components which may all be pre-punched to form the bolt holes therein and which can readily be welded to the spine 16 at desired locations thereon. In addition, the several brackets such as the brackets 40 and 42 may be identical to one another and supplied as standard or modular components.

It will be noted that the spine 16 itself carries only the saddle members 18, while the saddles serve to mount the conveyor chain wear plates and also the brackets 40 and 42 which mount the remaining conveyor components. The side brackets 40 and 42 also serve to connect with the floor support tubes 14, although it will be noted that it is not always necessary to provide a floor support at each of the saddle locations. Moreover, the article conveyor of the present invention uses less material than conventional endless chain conveyors, contains no closed areas and thus is substantially easier to clear and maintain in a sanitary condition than conventional conveyors, and it is unusually light in weight and can be assembled in much less time than is normally required to assembly conveyors of the type heretofore known.

With reference to the spine member 16, in the preferred embodiment described herein the spine member comprises a tube of circular cross-section having a diameter which is less than the width of the endless conveyor chain 100. It will be understood however the spine member may take other forms insofar as its cross-sectional configuration is concerned, but preferably it is a generally hollow member having an outside dimension less than the width of the conveyor chain. Moreover, the spine preferably has no bolt holes or the like formed therein and serves simply as the basic structural element of the conveyor to which a plurality of mounting members such as the saddles 18 may be welded.

While we have described our invention in certain preferred forms, we do not intend to be limited to such forms, since modifications coming within the scope of our invention will readily occur to those skilled in the art, particularly with our disclosure before them.

We claim:

1. Article conveyor mechanism of the type having a motor-driven endless conveyor chain for conveying articles such as cans and bottles, the improvement comprising, in combination, a spine member extending longitudinally along the length of the conveyor, a plurality of saddle means mounted on the spine member and fixedly secured thereto at spaced intervals along the length of the spine member, individual wear plate means carried on corresponding ones of said saddle means for intermittently supporting an operative portion of the conveyor chain during movement of the latter to convey articles, guide means supported from said saddle means for guiding articles which are disposed on said conveyor chain for movement therewith, said spine having a width dimension not exceeding the width dimension of said conveyor chain, and a plurality of floor-mounted support means connected with said saddle means for supporting the conveyor mechanism a predetermined distance above a floor surface.

2. The invention of claim 1 where said spine member comprises a tube of circular cross-section having a diameter less than the width of said conveyor chain.

3. The invention of claim 2 where said plurality of saddle means are welded to said tube at spaced intervals along the length thereof.

4. The invention of claim 1 where each of said saddle means comprises a stamping which is bent to form a top wall and oppositely disposed side walls, said top wall serving to mount said wear plate means.

5. The invention of claim 2 where each of said saddle means is formed with a generally semi-circular seat at its underside which permits the same to be mounted on the top of the tubular spine member.

6. The invention of claim 1 including generally vertical bracket means affixed to opposite sides of said saddle means, said bracket means serving to mount said guide means.

7. The invention of claim 6 where said bracket means carries chain return support means disposed beneath said spine member for supporting the conveyor chain during its unloaded return travel.

8. The invention of claim 7 where said bracket means is also pivotally connected with said floor-mounted support means.

9. Article conveyor mechanism of the type having a motor-driven endless conveyor chain for conveying articles such as cans and bottles, the improvement comprising, in combination, a tubular spine member of circular cross-section extending longitudinally along the length of the conveyor and having a diameter less than the width of the conveyor chain, a plurality of saddle means mounted on the spine member at spaced intervals along the length of the spine member and welded thereto, individual wear plate means mounted on the top of corresponding ones of said saddle means for intermittently supporting an operative portion of the conveyor chain during movement of the latter to convey articles, bracket means affixed to opposite sides of said saddle means, said bracket means serving to mount guide means above said spine and on opposite sides thereof for guiding articles which are disposed on said conveyor chain for movement therewith, said bracket means also serving to mount chain return support means disposed beneath said spine member for supporting the conveyor chain during its unloaded return travel, and a plurality of floor-mounted support means connected with said saddle means for supporting the conveyor mechanism a predetermined distance above a floor surface.

10. The invention of claim 9 where each of said saddle means comprises a stamping which is bent to form a top wall and oppositely disposed side walls, said top wall serving to mount said wear plate means.

11. The invention of claim 10 where each of said saddle means is formed with a generally semi-circular seat at its underside which permits the same to be mounted on the top of the tubular spine member.

12. The invention of claim 9 where said bracket means is pivotally connected with said floor-mounted support means, said pivotal connection being located beneath said chain return support means.

13. The invention of claim 9 where each of said bracket means comprises a bracket which is secured to a side of said saddle means and includes an upwardly extending bracket arm and a downwardly extending bracket arm, said upwardly extending bracket arm serving to mount said guide means above said spine and said downwardly extending bracket arm serving to mount said chain return support means beneath said spine, and at least selected ones of said downwardly extending bracket arms being connected with said floor-mounted support means.

References Cited

UNITED STATES PATENTS

| | | | |
|---|---|---|---|
| 2,360,086 | 10/1944 | Thurman | 74—242.15 X |
| 2,401,540 | 6/1946 | Berlinger | 198—204 X |
| 2,592,670 | 4/1952 | Earnhardt | 74—242.13 |
| 3,292,772 | 12/1966 | Rice | 198—204 |
| 3,381,800 | 5/1968 | Everett | 198—204 |

GERALD M. FORLENZA, Primary Examiner

G. F. ABRAHAM, Assistant Examiner

U.S. Cl. X.R.

74—242.13, 242.15; 198—208